(12) United States Patent
Wirth et al.

(10) Patent No.: US 12,273,860 B2
(45) Date of Patent: Apr. 8, 2025

(54) WIRELESS COMMUNICATION SYSTEM HAVING A SPECIFIC SIDELINK FRAME STRUCTURE

(71) Applicant: KONINKLIJKE PHILIPS N.V., Eindhoven (NL)

(72) Inventors: Thomas Wirth, Berlin (DE); Sarun Selvanesan, Berlin (DE); Thomas Fehrenbach, Berlin (DE); Cornelius Hellge, Berlin (DE); Baris Göktepe, Berlin (DE); Thomas Schierl, Berlin (DE); Roya Ebrahim Rezagah, Berlin (DE)

(73) Assignee: Koninklijke Philips N.V., Eindhoven (NL)

(*) Notice: Subject to any disclaimer, the term of this patent is extended or adjusted under 35 U.S.C. 154(b) by 429 days.

(21) Appl. No.: 17/711,644

(22) Filed: Apr. 1, 2022

(65) Prior Publication Data

US 2022/0240226 A1 Jul. 28, 2022

Related U.S. Application Data

(63) Continuation of application No. PCT/EP2020/077535, filed on Oct. 1, 2020.

(30) Foreign Application Priority Data

Oct. 2, 2019 (EP) .................................. 19201125

(51) Int. Cl.
*H04W 4/46* (2018.01)
*H04W 72/02* (2009.01)
(Continued)

(52) U.S. Cl.
CPC ....... *H04W 72/02* (2013.01); *H04W 72/0446* (2013.01); *H04W 72/20* (2023.01); *H04W 76/20* (2018.02); *H04W 92/18* (2013.01)

(58) Field of Classification Search
None
See application file for complete search history.

(56) References Cited

U.S. PATENT DOCUMENTS 11,284,387 B2 *  3/2022  Lin ..................... H04W 72/02
2001/0036154 A1  11/2001  Takagi
(Continued)

FOREIGN PATENT DOCUMENTS

EP          3096576 A1    11/2016
EP          3127384 A1     2/2017
(Continued)

OTHER PUBLICATIONS

Fraunhofer HHI, Fraunhofer IIS , Design of NR V2X Physical Layer Structures[online] , 3GPP TSG RAN WG1 #98 R1-1908677 , Internet<URL:https://www.3gpp.org/ftp/tsg_ran/WG1_RL1/TSGR1_98/Docs/R1-1908677.zip> , Aug. 16, 2019.

(Continued)

*Primary Examiner* — Ajit Patel

(57) ABSTRACT

According to embodiments (main aspect), a wireless communication system includes one or more base stations and a plurality of user equipment UEs. The plurality of user equipment is configured for a sidelink communication (e.g., a sidelink transmission), wherein a sidelink communication includes one or more sidelink frames each having a control region and a data region wherein the control region includes a first control region and a second control region, wherein the first control region including basic information regarding a sidelink transmission of a packet, the second control region including information regarding data transmission resource location or data transmission resource locations of the packet. Here, a transmission of the packet uses more than a single data transmission resource location in a single sidelink frame, and/or wherein the packet is to be transmitted in data transmission resource locations across one or more (Continued)

subsequent sidelink frames, or wherein multiple versions of the packet are to be transmitted in data transmission resource locations across one or more subsequent sidelink frames.

27 Claims, 9 Drawing Sheets

(51) Int. Cl.
*H04W 72/0446* (2023.01)
*H04W 72/20* (2023.01)
*H04W 76/20* (2018.01)
*H04W 92/18* (2009.01)

(56) References Cited

U.S. PATENT DOCUMENTS

| | | |
|---|---|---|
| 2018/0270714 A1 | 9/2018 | Martin et al. |
| 2019/0357304 A1* | 11/2019 | Zeng .................... H04L 5/0051 |
| 2020/0296731 A1* | 9/2020 | Chae .................... H04W 72/52 |

FOREIGN PATENT DOCUMENTS

| | | |
|---|---|---|
| EP | 3457770 A1 | 3/2019 |
| WO | 2015/149861 A1 | 10/2015 |
| WO | 2018/197483 A1 | 11/2018 |

OTHER PUBLICATIONS

Kyocera, Sidelink Physical Layer Structure[online], 3GPP TSG RAN WG1#98 R1-1909015, Internet<URL:https://www.3gpp.org/ftp/tsg_ran/WG1_RL1/TSGR1_98/Docs/R1-1909015.zip>, Aug. 15, 2019.

D2: "3GPP TSG-RAN WG1 Meeting #98 R1-1909419", Convida Wireless, On physical layer structure for NR V2X sidelink;.

* cited by examiner

WIRELESS COMMUNICATION SYSTEM HAVING A SPECIFIC SIDELINK FRAME STRUCTURE

CROSS-REFERENCES TO RELATED APPLICATIONS

This application is a continuation of copending International Application No. PCT/EP2020/077535, filed Oct. 1, 2020, which is incorporated herein by reference in its entirety, and additionally claims priority from European Application No. EP 19 201 125.2, filed Oct. 2, 2019, which is incorporated herein by reference in its entirety.

BACKGROUND OF THE INVENTION

The present application relates to the field of wireless communication networks or systems, more specifically to a sidelink communication of user devices in such communication systems. Embodiments relate to a new radio sidelink frame structure, NR SL FS. Further embodiments refer to a communication system, to a corresponding UE, base station and method. Advantageous embodiments relate to NR V2X enabling slot aggregation using two stage SCI.

FIGS. 1A and 1B are schematic representations of an example of a terrestrial wireless network 100 including, as is shown in FIG. 1A a core network 102 and one or more radio access networks $RAN_1$, $RAN_2$, ... $RAN_K$. FIG. 1B is a schematic representation of an example of a radio access network RAND that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1B shows an exemplary view of only five cells, however, the RAND may include more or less such cells, and RAND may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1B by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIGS. 1A and 1B may by a heterogeneous network having distinct overlaid networks, e.g., a network of macro cells with each macro cell including a macro base station, like base station $gNB_1$ to $gNB_5$, and a network of small cell base stations (not shown in FIGS. 1A and 1B), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIGS.

1A and 1B, for example in accordance with the LTE-Advanced Pro standard or the 5G or NR, new radio, standard.

In mobile communication networks, for example in a network like that described above with reference to FIGS. 1A and 1B, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIGS. 1A and 1B. This is referred to as an "in-coverage" scenario. Another scenario is referred to as an "out-of-coverage" scenario. It is noted that "out-of-coverage" does not mean that the two UEs are not within one of the cells depicted in FIGS. 1A and 1B, rather, it means that these UEs
- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations and NR base stations that do not support V2X services.

Yet another scenario is called a "partial coverage" scenario, in accordance with which one of the two UEs which communicate with each other over the sidelink, is served by a base station, while the other UE is not served by the base station.

When considering two UEs directly communicating with each other over the sidelink, e.g. PC5, one of the UEs may also be connected with a BS, and may relay information from the BS to the other UE via the sidelink interface. The relaying may be performed in the same frequency band (in-band-relay) or using another frequency band (out-of-band relay). In the first case, communication on the Uu and on the sidelink may be decoupled using different time slots as in time division duplex (TDD) systems.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIGS. 1A and 1B. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 1 configuration in NR V2X or as a mode 3 configuration in LTE V2X.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is an out-of-coverage scenario does not mean that the respective mode 4 UEs are outside of the coverage 200 of a base station, rather, it means that the respective mode 4 UEs are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the mode 3 UEs 202, 204 also mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. Within the wireless communication network or within a cell thereof, a plurality of such groups may exist at the same time. While it is noted that the communication within the group is via sidelink communication, in case the group or at least some group members thereof are in-coverage, this does not exclude that also some or all of the group members communicate with other entities outside the group via the base station or via the sidelink. For example, the above-described scenarios using vehicular user devices may be employed in the field of the transport industry in which a plurality of vehicles being equipped with vehicular user devices may be grouped together, for example, by a remote driving application.

Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form conventional technology that is already known to a person of ordinary skill in the art.

SUMMARY

An embodiment may have a wireless communication system, comprising: a plurality of user equipments, UEs, wherein the plurality of UEs are configured for a sidelink communication, wherein a sidelink communication comprises one or more sidelink frames each comprising a control region and a data region, wherein the control region comprises a first control region and a second control region, wherein the first control region comprising basic information regarding a sidelink transmission of a packet, the second control region comprising information regarding data transmission resource location or data transmission resource locations of the packet, wherein a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

Another embodiment may have a wireless communication system, comprising: a plurality of user equipments, UEs, wherein the plurality of UEs are configured for a sidelink communication, wherein a sidelink communication comprises one or more sidelink frames each comprising a control region and a data region, wherein a control information belonging to a first control region is transmitted within the control region, wherein a control information belonging to a second control region is transmitted or partially transmitted using mac layer or (PC5) RRC configurations.

Another embodiment may have a user device, UE, for a wireless communication system comprising a plurality of user devices, UEs, wherein the plurality of UEs are configured for a sidelink communication, wherein a sidelink communication comprises one or more sidelink frames each comprising a control region and a data region, wherein the control region comprises a first control region and a second control region, wherein the first control region comprising basic information regarding a sidelink transmission of a packet, the second control region comprising information regarding data transmission resource location or data transmission resource locations of the packet, wherein a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

Another embodiment may have a method for a sidelink communication in a wireless communication system comprising a plurality of user devices, UEs, wherein the plurality of UEs are configured for a sidelink communication, wherein a sidelink communication comprises one or more sidelink frames each comprising a control region and a data region, wherein the control region comprises a first control region and a second control region, wherein the first control region comprising basic information regarding a sidelink transmission of a packet, the second control region comprising information regarding data transmission resource location or data transmission resource locations of the packet, wherein a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
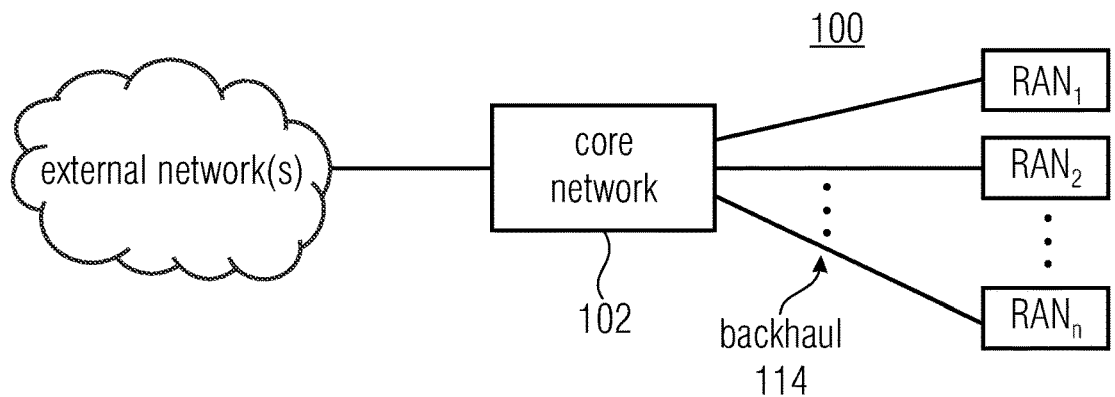
FIGS. 1A and 1B show a schematic representation of an example of a wireless communication system.
Figure 1B:
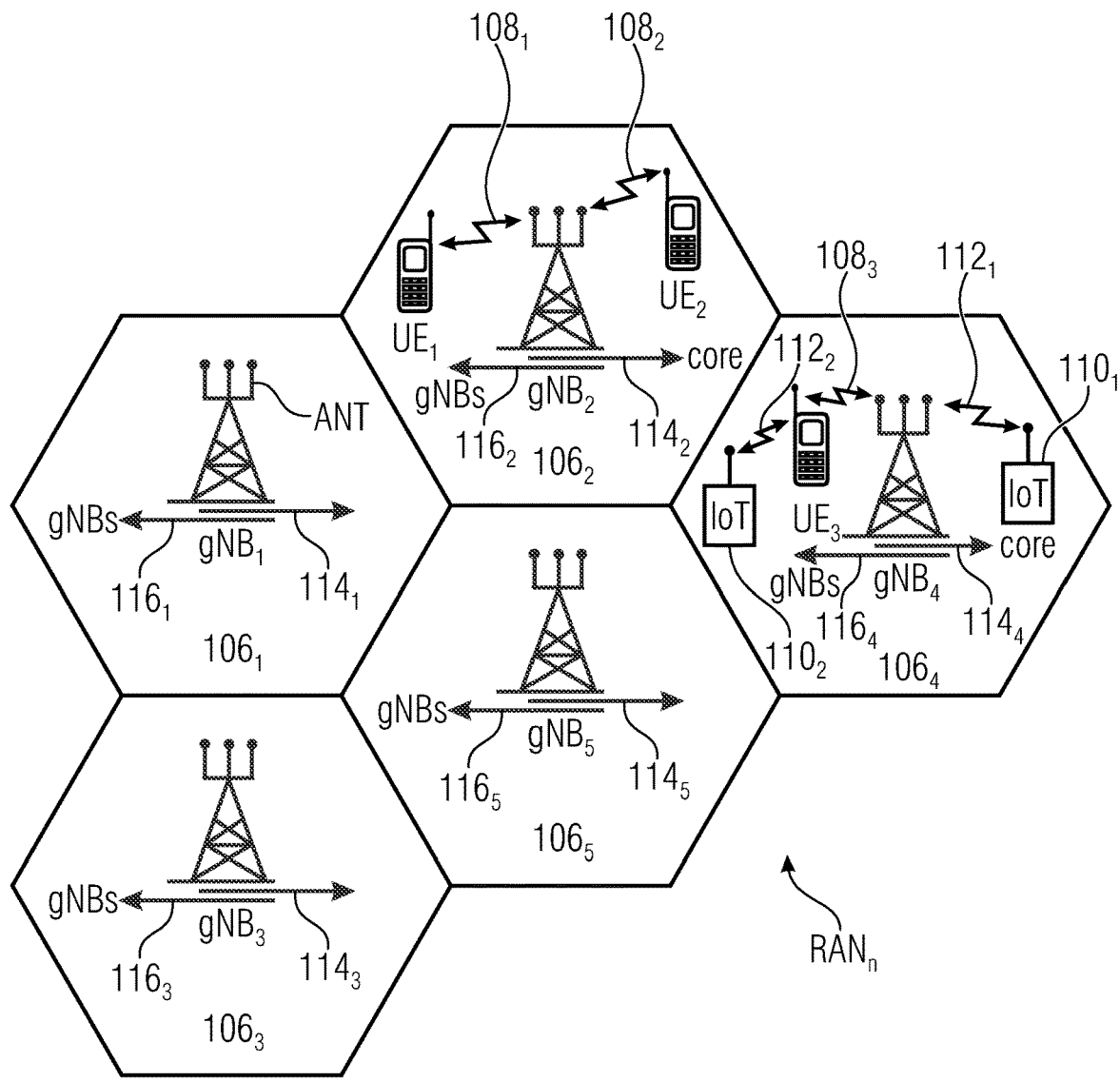
Figure 2:
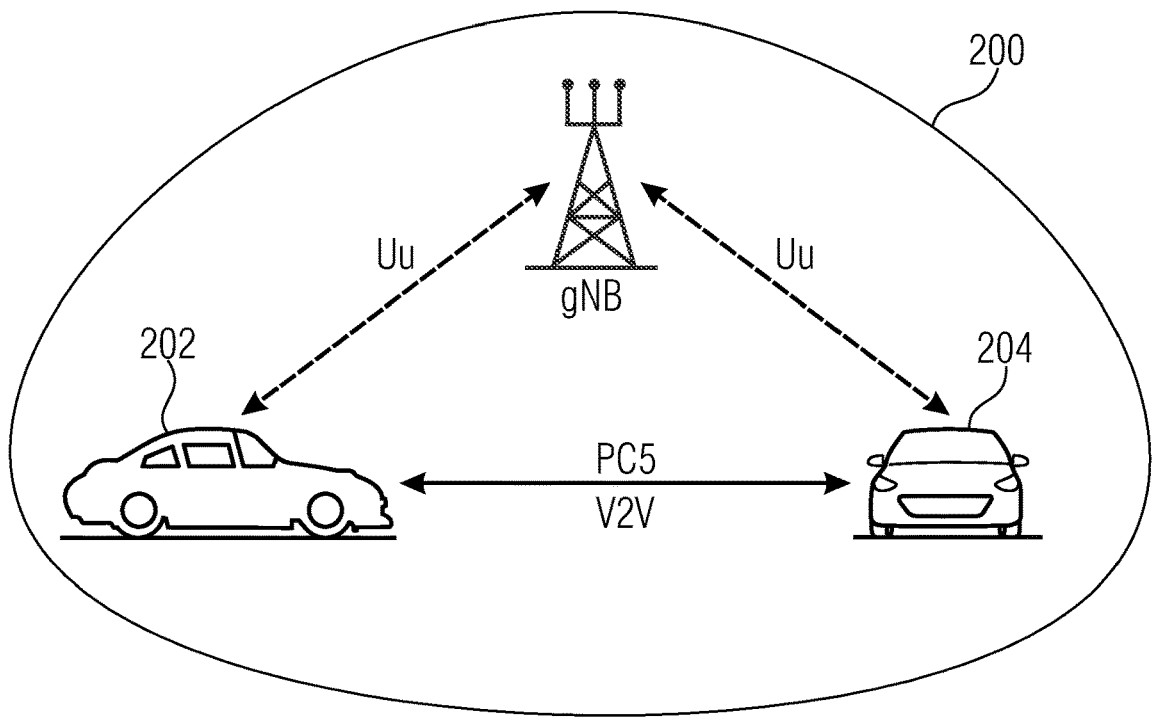
FIG. 2 shows a schematic representation of a situation in which UEs directly communicating with each other are in coverage of a base station.
Figure 3:
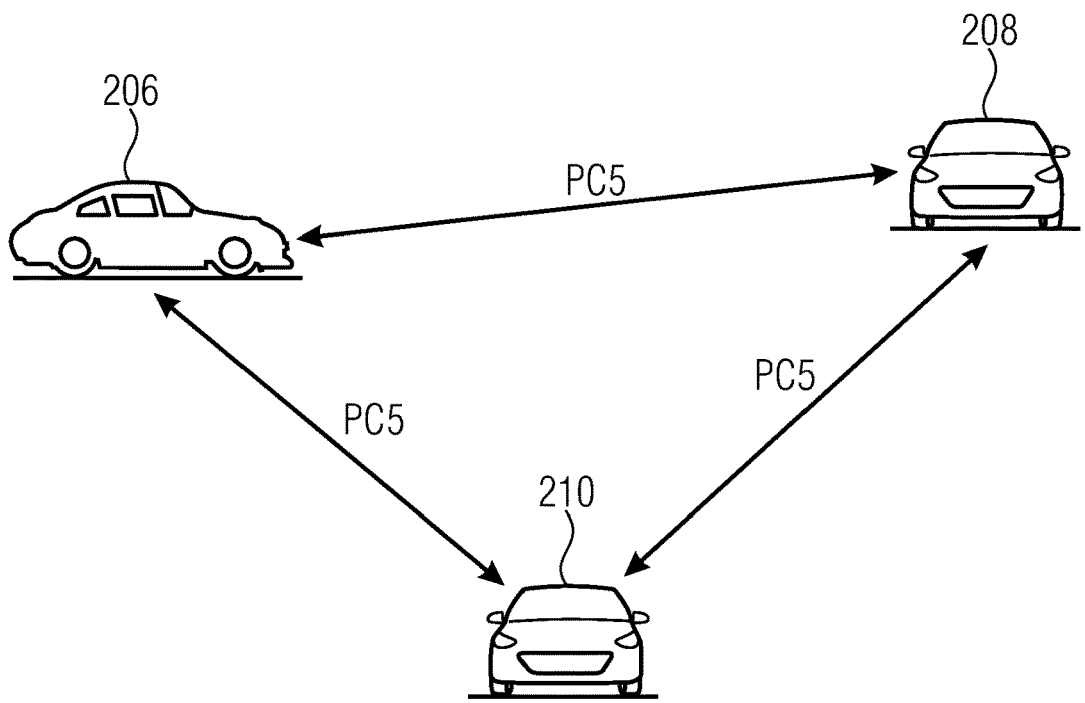
FIG. 3 shows a scenario in which UEs directly communicating with each other are not are not in coverage of a base station, i.e., are not connected to a base station.
Figure 4:
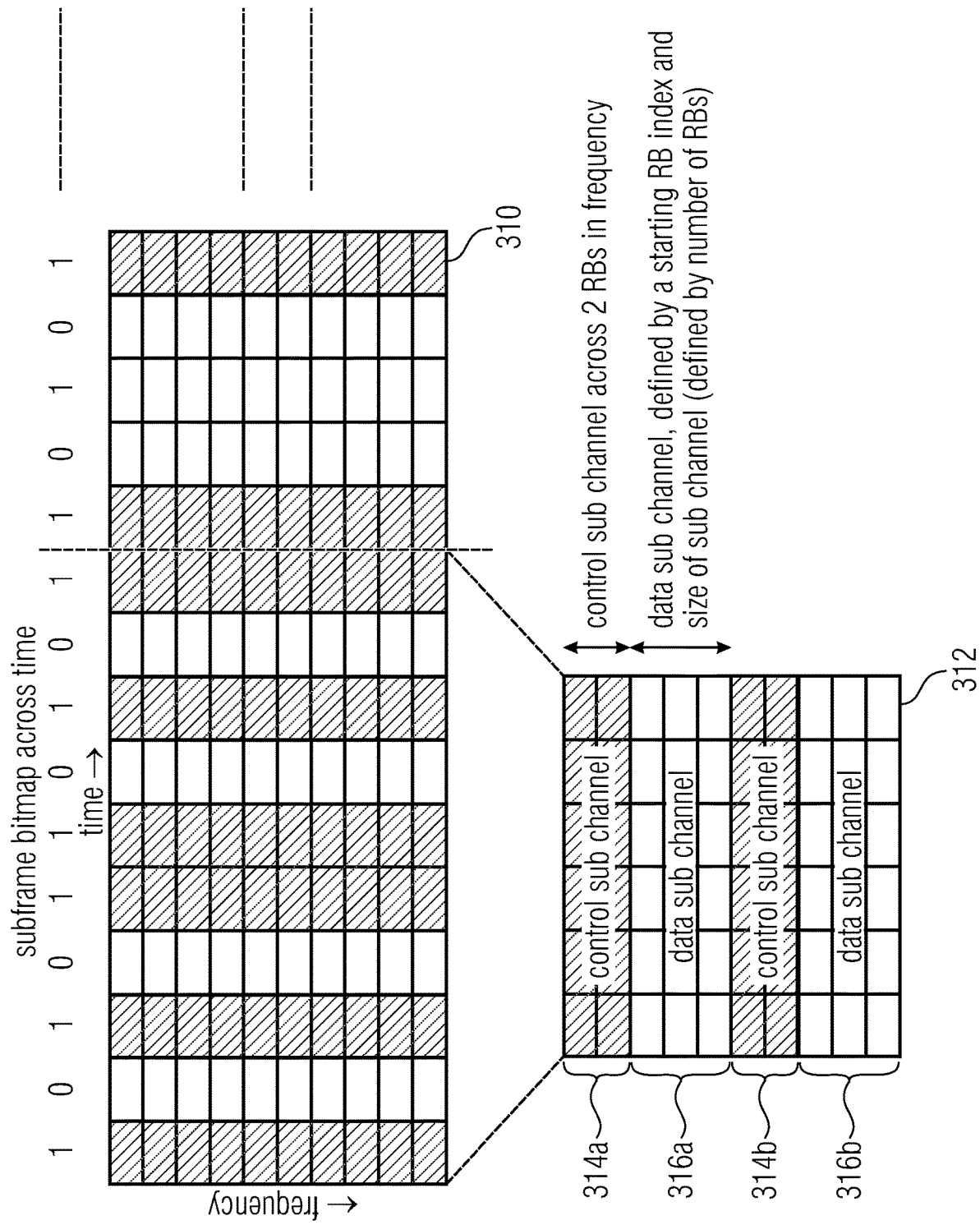
FIG. 4 illustrates an example of a resource pool which is defined across time and frequency.

Embodiments of the present invention is now described in more detail with reference to the accompanying drawings in which the same or similar elements have the same reference signs assigned.

The initial vehicle-to-everything (V2X) specification was included in Release 14 of the 3GPP standard. The scheduling and assignment of resources have been modified according to the V2X requirements, while the original device-to-device (D2D) communication standard has been used as the basis of the design. Release 15 of the LTE V2X standards (also known as enhanced V2X or eV2X) and Release 16, 3GPP and the first release of 5G NR V2X, respectively, will have a focus on V2X slot aggregation. NR V2X had identified a set of use cases to be achieved and one of the key focus areas for these use cases is to guarantee a certain Quality-of-Service (QoS) for a given application service.

According to an aspect, two stages of the Sidelink Control Information (SCI) can be beneficially used. The first stage is used for transmitting basic information to the UEs, which include a pointer to the second stage SCI which is coupled with the corresponding data transmission. Another aspect is how to handle the aggregation of slots for larger transmissions.

Since the control region was defined for a time slot, it is an objective to optimize the use of the control region especially for using slot aggregation, and for achieving maximum reliability in the transmissions.

According to embodiments (main aspect), a wireless communication system may or may not comprise of one or more base stations and a plurality of user equipment UEs. The plurality of user equipment is configured for a sidelink communication (e.g., a sidelink transmission), wherein a sidelink communication comprises one or more sidelink frames each having a control region and a data region wherein the control region comprises a first control region and a second control region, wherein the first control region comprising basic information regarding a sidelink transmission of a packet, the second control region comprising information regarding data transmission resource location or data transmission resource locations of the packet. Here, a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

Regarding the wireless system, the base stations may or may not be present, corresponding to in or out-of-coverage scenarios, or NR Mode 1 and NR Mode 2 operations of the UEs.

Regarding the slot aggregation, it should be noted that this concept can either be used for sending large sized packets, or to send different redundancy versions of the same packet.

Embodiments of the present invention are based on the principle that a control region can comprise of two stages, wherein for the two stages/control regions dedicated portions within a time frame can be reserved. The second stage SCI can comprise an information pointing to the one or more locations of the data transmission, e.g., within the same time slot or within a succeeding time slot. Especially for NR V2X applications catering to slot aggregation the two stage SCI is beneficial. This concept enables to provide key information in the SCI whether each data transmission would be using aggregated data resources or a single data resource. In the case where multiple data resources would be aggregated, the packet to be transmitted is spanned across more than a single time slot. Below is the content of the control information transmitted in the control two regions (in these aggregated slots).

Note that according to embodiments, the one or more subsequent sidelink frames can be located in continuous or non-continuous sidelink frames for the transmission of a packet by a given UE. This means that, for example, between two subsequent sidelink frames used for said sidelink transmission, none, one or more further sidelink frames may be arranged, where the sidelink frames in between, if present, can be used by other UEs.

A differentiation between two basic cases is made. According to a first case, the first and the second control region are transmitting using the same sidelink frame. Here, both control regions may also be transmitted along with a portion of data transmission (e.g., the first portion of the packet), or a first version of the data transmission, e.g., when a redundancy version of the same packet to be transmitted.

According to embodiments, the first control region can comprise an information pointing to the second control region arranged in the same sidelink frame, as well as the second control region in each of the one or more subsequent sidelink frames.

According to further embodiments, the sidelink transmission carried out by a UE may use one or more subsequent sidelink frames, wherein the first control region of the one or more subsequent sidelink frames is vacant or to be used by other UEs or the plurality of UEs.

Note that the control region is vacant in view of the particular UE of the communication system. Other UEs are free to use the vacant first control region, e.g., for a pre-emption, or reservation of resources.

According to embodiments, the sidelink transmission uses one or more subsequent sidelink frames, wherein the information of the first control region transmitted using the first sidelink frame is sent again within the first control region of the one or more subsequent sidelink frames. This first control region comprises an information pointing to the second control regions in the further one or more subsequent sidelink frames.

According to further embodiments, the sidelink transmission may use one or more subsequent sidelink frames, wherein the second control region of the one or more subsequent sidelink frames comprises an information regarding the data transmission resource location of the respective sidelink frame or regarding data transmission resource locations.

According to a second case (embodiment) the first and the second control region are transmitted using different sidelink frames, e.g., subsequent sidelink frames, wherein subsequent means located in continuous or non-continuous sidelink frames. For example, the first control region is transmitted using a first sidelink frame and the second control region is transmitting using a second subsequent sidelink frame. Here, the first control information may, according to embodiments, comprise information pointing to the second control region or the second control regions in a respective or in the subsequent sidelink frames.

According to embodiments, the second control region belonging to the sidelink frame within which the first control region is transmitted is left vacant by the UE carrying out the given transmission, and can be used by other UEs or the plurality of UEs.

According to embodiments, the sidelink transmission uses one or more subsequent sidelink frames, wherein each of the one or more subsequent sidelink frames comprises a respective second control portion. Alternatively, a respective second control portion of one or more succeeding sidelink frames comprises an information pointing to the data region.

According to embodiments, within one or more of the succeeding sidelink frames a respective first control portion is retransmitted. Alternatively the respective first control portion comprises an information pointing to the one or more second control portions in the further one or more subsequent sidelink frames.

In connection with all the above-discussed embodiments, it should be noted that according to further embodiments, the first control portion can comprise, an information regarding the destination ID of the RX UE. Alternatively, an information regarding a number of the data transmission resource locations and/or a number of the sidelink frames used for data transmission resource locations and/or an information pointing to the respective second control portions transmitted using subsequent sidelink frames may be comprised.

Embodiments provide a user device, UE, for a wireless communication system that may or may not have one or more base stations, and a plurality of user devices, UEs, wherein the plurality of UEs are configured for a sidelink communication. A sidelink communication comprises one or more sidelink frames each having a control region and a data region, wherein the control region comprises a first control region and a second control region, wherein the first control region comprising basic information regarding a sidelink transmission of a packet, the second control region comprising information regarding data transmission resource location or data transmission resource locations of the packet.

Here, a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

Embodiments provide a base station for a wireless communication system, having one or more base stations, and a plurality of user devices, UEs, wherein the plurality of UEs are configured for a sidelink communication, wherein a sidelink communication comprises one or more sidelink frames each having a control region and a data region. The control region comprises a first control region and a second control region, wherein the first control region comprising basic information regarding a sidelink transmission of a packet, the second control region comprising information regarding data transmission resource location or data transmission resource locations of the packet. A transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

Embodiments provide a method for a sidelink communication in a wireless communication system that may or may not have one or more base stations, a plurality of user devices, UEs, wherein the plurality of UEs are configured for a sidelink communication, wherein a sidelink communication comprises one or more sidelink frames each having a control region and a data region. The control region comprises a first control region and a second control region, wherein the first control region comprising basic information regarding a sidelink transmission of a packet, the second control region comprising information regarding data transmission resource location or data transmission resource locations of the packet. A transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

Note, at a given transmit time interval, TTI, or subframe, a transmitting UE broadcasts a sidelink control information, SCI, in the control channel, followed by the data in the same subframe. The SCI will point to the resources within the subframe that data will be transmitted on, and a receiving UE will listen to the control sub-channel so that when it does receive an SCI it is made aware where the data is to be received.

According to embodiments (additional aspect), a wireless communication system, comprising: none, one or more base stations; and a plurality of user equipments, UEs, wherein the plurality of UEs are configured for a (sidelink) communication. A (sidelink) communication comprises one or more (sidelink) frames each having a control region and a data region, wherein a control information belonging to a first control region is transmitted within the control region as first control region of the control region. A control information belonging to a second control region is transmitted or partially transmitted using layer 2 (PC5-)RRC configurations.

Embodiments of this aspect are based on the finding that information typically transmitted using the second control region (cf. above) can be transmitted completely or partially via a kind of higher layer signalling, here the layer 2 PC5-RRC configurations that is sent via the sidelink, or PC5 (PC5-radio resource control configurations, also referred to as sidelink radio resource control configurations).

Note, "completely" means that just the first control region within the sidelink frame is used, while the complete information belonging to the second control region is transmitted using PC5-RRC. "Partially" means that the first control region and a second control region, having a reduced size, is used together with the layer 2 PC5-RRC configurations. This is beneficial since the reduced size of the second control region (according to embodiments reduced to zero) enables more resources for the data transmission within the respective sidelink frame. Due to the usage of the first control region within the respective sidelink frame it is still enabled to indicate a respective sidelink communication.

According to embodiments a control information belonging to the second control region is partially transmitted as second control region of the control region.

According to embodiments the first control region is transmitted by use of a sidelink frame previous to the sidelink frame used for a sidelink transmission of a packet or together with the sidelink transmission of the packet.

According to embodiments the second control region is transmitted using one or more subsequent time sidelink frames.

According to embodiments the size for transmitting the second control region is reduced gradually. Expressed in other words, an amount of control information belonging to the second control region and transmitted using the second control region is reduced while an amount of control information belonging to the second control region and transmitted using the layer 2 PC5-RRC configurations is increased or, vice versa, an amount of control information belonging to the second control region and transmitted using the second control region is increased while an amount of control information belonging to the second control region and transmitted using the layer 2 PC5-RRC configurations is reduced. The respective decrease or increase of the amount of control information belonging to the second control region occurs with respect to the number of one or more subsequent time sidelink frames. For example, the amount of control information sent in the second control region is reduced gradually in each of the subsequent sidelink frames used for transmission.

According to embodiments the second control region is transmitted by use of a sidelink frame previous to the sidelink frame used for a sidelink transmission of a packet or together with the sidelink transmission of the packet.

According to embodiments the first control region comprises an information pointing to the second control region or to the information belonging to a second control region transmitted or partially transmitted using the layer 2 PC5-RRC configurations. Alternatively, wherein the information belonging to a second control region transmitted or partially transmitted as second control region of the control region comprises an information pointing to the second control region or to the information belonging to a second control region transmitted or partially transmitted using the layer 2 PC5-RRC configurations; and/or wherein the second control region comprises an information regarding data transmission resource location or data transmission resource locations of the packet.

According to embodiments, a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

According to further embodiments, the above-discussed principle of using the RRC configurations can be applied to the communication between the base station and a UE.

Thus, an embodiment provides a communication system, wherein the control information are control information to be transmitted by the one or more base stations. Here, the information belonging to second control region is transmitted using an RRC configuration over the Uu link instead of the RRC configuration over the PC5 link.

Another embodiment provides a user device, UE, for a wireless communication system that may or may not have one or more base stations, and a plurality of user devices, UEs, wherein the plurality of UEs are configured for a (sidelink) communication. A (sidelink) communication comprises one or more (sidelink) frames each having a control region and a data region. A control information belonging to a first control region is transmitted within the control region as first control region of the control region, wherein a control information belonging to a second control region is transmitted or partially transmitted using layer 2 PC5-RRC configurations (in general RRC).

Another embodiment provides a base station for a wireless communication system having one or more base stations, a plurality of user devices, UEs, wherein the plurality of UEs are configured for a (sidelink) communication. A (sidelink) communication comprises one or more (sidelink) frames each having a control region and a data region, wherein a control information belonging to a first control region is transmitted within the control region as first control region of the control region, wherein a control information belonging to a second control region is transmitted or partially transmitted using layer 2 (PC5-)RRC configurations.

Another embodiment provides a method for a wireless (sidelink) communication in a wireless communication system that may or may not have one more base stations, a plurality of user devices, UEs, wherein the plurality of UEs are configured for a (sidelink) communication. A (sidelink) communication comprises one or more sidelink frames each having a control region and a data region, wherein a control information belonging to a first control region is transmitted within the control region as first control region of the control region, wherein a control information belonging to a second control region is transmitted or partially transmitted using layer 2 (PC5-)RRC configurations.

Regarding all of the above-discussed embodiments/aspects it should be mentioned that according to embodiments the UE may comprise one or more of a mobile terminal, or stationary terminal, or cellular IoT-UE, or vehicular UE, or an IoT or narrowband IoT, NB IoT, device, or a ground base station vehicle, or an aerial vehicle, or a drone, or a moving base station, or a roadside unit, or a building, or any other items or devices provided with network connectivity enabling the item/device to communicate using the wireless communication network, e.g., a sensor or actuator, and wherein the base station comprises one or more of a macro cell base station, or a small cell base station, or a central unit of a base station, or a distributed unit of a base station, or a roadside unit, or a UE, or a remote radio head, or an AMF, or an SMF, or a core network unit, or a network slice as in the NR or 5G core context, or any transmission/reception point, TRP, enabling an item or a device to communicate using the wireless communication network, the item or device being provided with network connectivity communicating using the wireless communication network.

According to embodiments, the sidelink frame comprising a transmission time interval, a certain interval for which the apparatus reserved resources, like a sidelink sub frame, a TTI, a slot, and/or a mini-slot.

Regarding the above-mentioned methods, it should be noted that these may be computer implemented. Thus, an embodiment refers to a computer program for performing the instructions which are defined by the above-discussed methods.

Note, that all above discussed optional features, which have been meanly discussed in context of a communication system, may also be used for the corresponding device (UE or BS) or the corresponding method.

Below, embodiments will be discussed in detail referring to the enclosed drawings: The discussion is made on the assumption that in the case when the data packet to be transmitted needs to span multiple time slots. Here, the first stage would inform the RX UE of the upcoming number of retransmissions and the locations of the second stage SCIs corresponding to each of the retransmissions. The second stage would contain information about the retransmission resource locations, where the second stage SCI and the data would be contained in the same time slot. We propose the following methods to utilize the control region for a 2-stage SCI model, and are depicted in the diagrams of FIG. 5A to 7 accordingly.

Figure 5A:
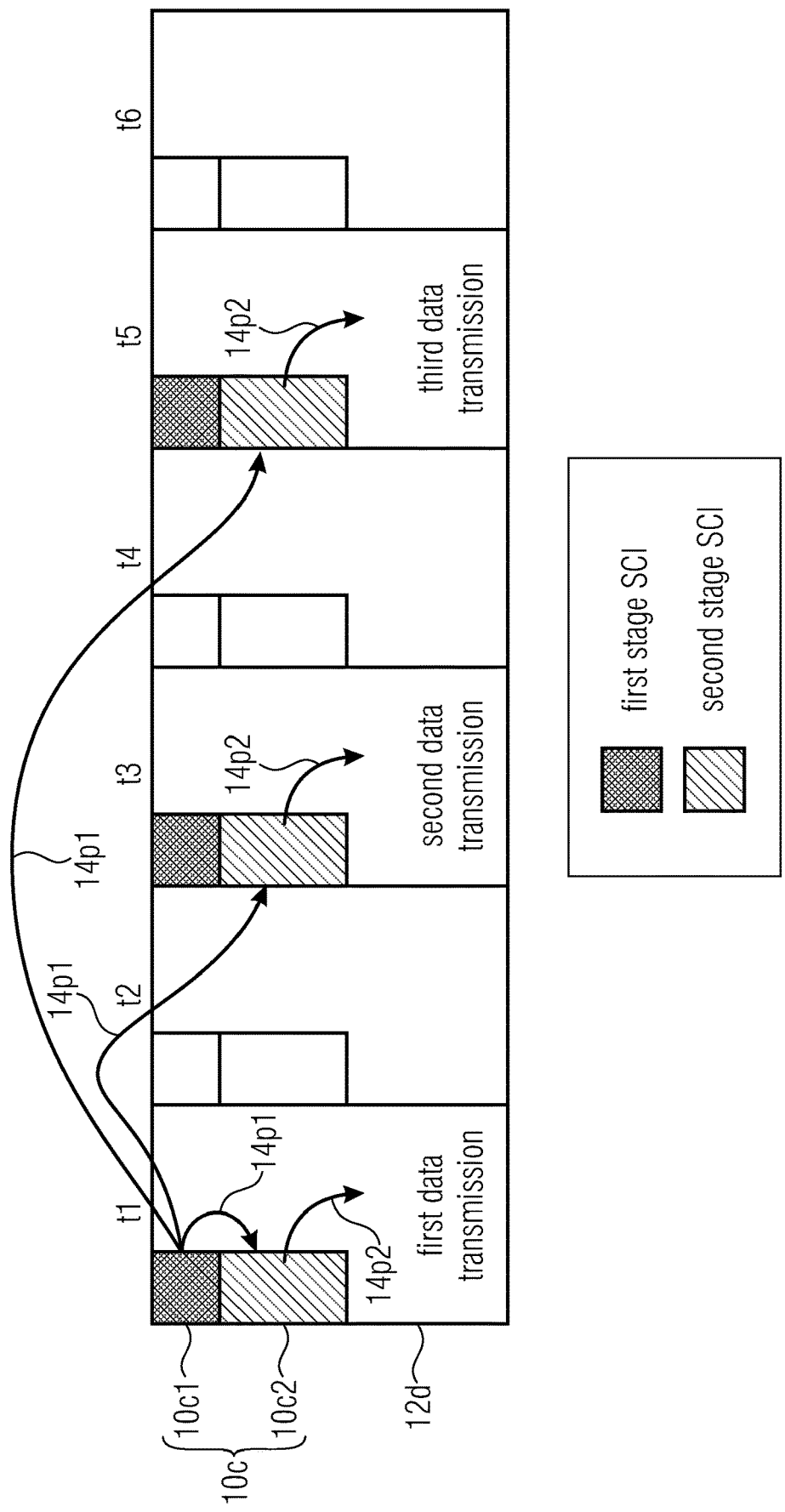
FIG. 5A illustrates exemplarily a sidelink frame structure for illustrating an embodiment according to which a first and a second control region are arranged together with a data region within the same time slot.

According to a basic embodiments the control channel comprises a first and a second control region. This is, for example illustrated by FIG. 5A FIG. 5A shows a design of a frame structure 1, e.g., to be used in NR V2X. FIG. 5 shows six time frames marked by t1 to t6. Within each time frame t1 to t6, three portions are illustrated, namely two control regions 10c1 and 10c2 as well as a data region 12d. Expressed in other words this means that for each time frame/sidelink frame there exists a control region 10c and a data region 12d in every time slot. The control region 10c is divided to contain two stages 10c1 and 10c2 of the SCI to be transmitted.

The sidelink structure 1 may, for example, contain a resource portion having a time domain (frames t1 to t6) and a frequency domain (along which control portions 10c1, 10c2 and data portions 12d are arranged) The resource portions may also be referred to as a sub channel, defined within a band width part (BWP).

As already indicated, a distinction is made between a case when data packets can be transmitted within the data region in a single time slot without aggregation of time slots (SOTA) or within different time slots. Here, with respect to FIG. 5A, the case that the first and the second stage SCI 10C1 and 10C2 are transmitted in the same time slot with the aggregation of time slots, e.g., t1.

According to embodiments, the first stage/first control region 10c1 can contain basic information, e.g., regarding the destination ID of the RX UE. Furthermore, according to embodiments, the control region 10c1 can contain a pointer pointing to the second control region 10c2 or especially to one or more second control regions 10c2 arranged within subsequent time slots, here the time slots t3 and t5. This pointer is illustrated by the reference numeral 14p1. According to embodiments, the second stage/second control region 10c2 can contain information regarding the data transmission resource location(s) of the packet. This can also comprise a pointer 14p2 pointing to the respective data region 12d. Since slot aggregation is advantageously used for transmitting the packet, the information contained by 10c2 can comprise one or more pointers 14p2 pointing to a plurality of data regions 12d of a plurality of time slots t1, t3 and t3. Note, of course, the pointer 14p2 of the control region 10c2 which is transmitted with a time slot t3 just comprises a pointer to the data portion 12d of t3 and optionally of t5. Expressed in other words this means that when starting from the assumption that slot aggregation is used, the second stage 10c2 comprises information regarding retransmission resource locations.

Below, this principle including optional elements will be discussed in detail:

The first stage SCI 10c1, first of the second state SCI 10c2 and the first transmission 12d are located within the same time slot, here the time slot t1. In this case, there is no prior reservation for said (sidelink) transmission. The RX UE would be made aware of the transmission by the first stage SCI 10c1, which points to the first of the second stage SCIs 10c2 which in turn points to the first transmission 12d of data belonging to the time frame t1. In the time slot t3 for the second transmission, the control region for the first stage SCI (cf. 10c1) would remain vacant and can be utilized by other UEs interested in reserving future transmissions. The second stage SCI 10c2 of t3 pointing to the data 12d of t3 would occupy the rest of the time slot.

Note that the data regions 12d as well as the control regions 10c1 and 10c2, e.g., of the time frame t2 or t4 or t6 are vacant as well, so the same can be used by other UEs. It is also possible for the time frames t2, t4 and t6 to be used by the transmission in a consecutive manner, where the data regions 12d as well as the control regions 10c1 and 10c2 are used for the transmission of the same packet.

Figure 5B:
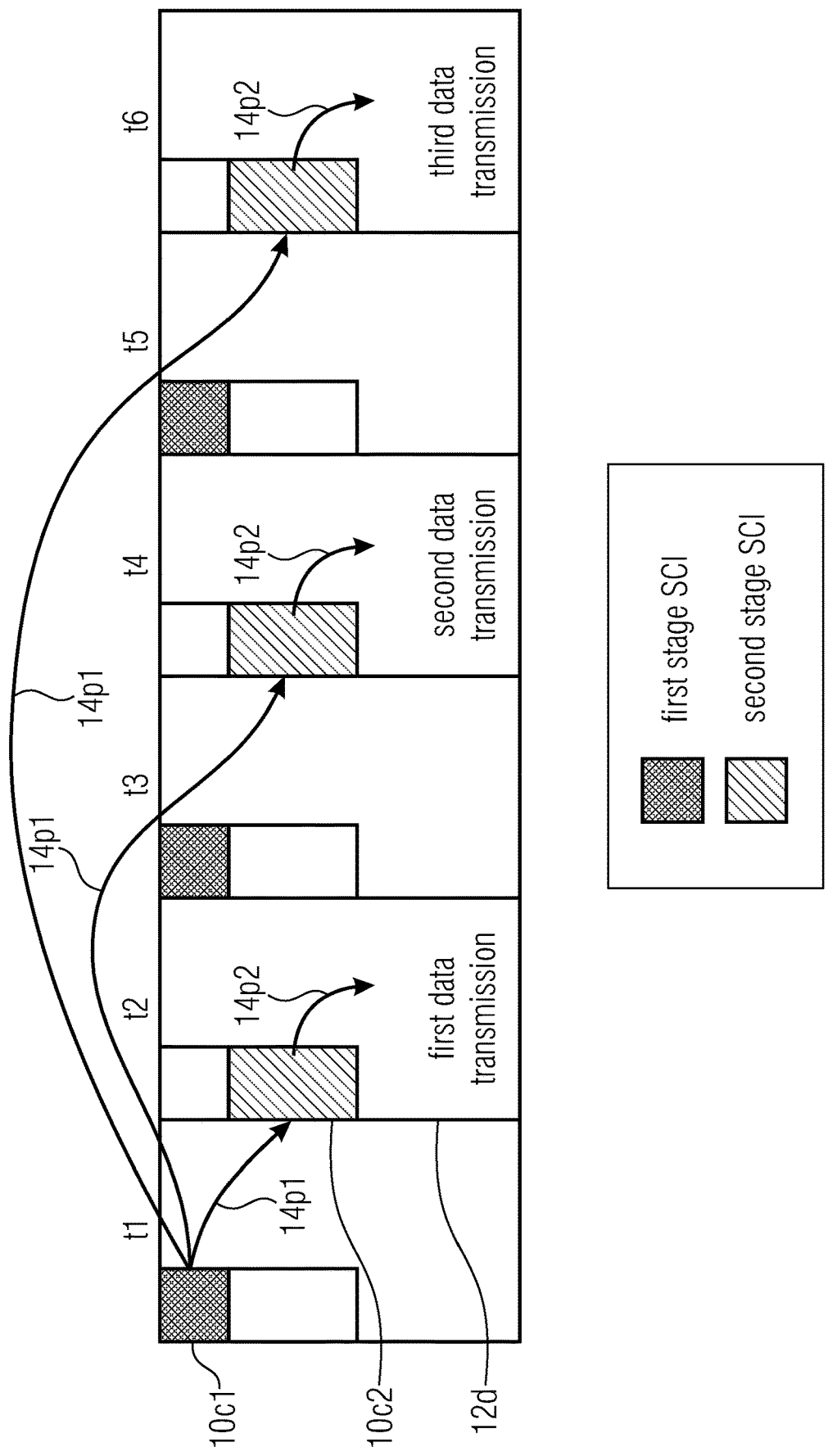
FIG. 5B shows schematic sidelink frame structure for illustrating an embodiment according to which a first control region and a second control region are arranged within different time slots.

With respect to FIG. 5B, another basic embodiment according to which a first and a second stage SCI (cf. 10c1 and 10c2) can be transmitted in different time slots (e.g., t1 and t2).

As it is illustrated, within a time frame t1, the first control region 10c1 is transmitted, while the second control region 10c2 is transmitted within the time frame t2. Within the same time frame t2, the data region 12d is transmitted. Further data within the data regions 12d are transmitted during time frame t4 and t6. For example, each frame t4 and t6 may also comprise a respective second control portion 10c2.

As you can see, the first and the second stage 10c1 and 10c2 are transmitted in the different time slots t1 and t2, while the second control region 10c2 is also transmitted during t4 and t6. According to embodiments, the first stage 10c1 containing basic information as well as pointer 14p1 pointing to the respective second control regions 10c2, e.g., within the time frames t2, t4 and t6. The second stage can contain information regarding retransmission resource locations as it is illustrated by the second pointer 14p2. This pointer 14p2 may, for example, point to the respective data region 12d within the respective time frame t2, t4 and t6.

Below, details of this embodiment using different time slots for the first and the second stage SCI will be discussed. As mentioned, the first stage SCI is sent first only once in a time slot, followed (e.g., directly or with other frames in between) by the first of the second stage SCIs and the first transmission in a later time slot. In this case, the first stage SCI 10c1 serves as a reservation of resources for upcoming retransmissions. The time slot used to send the first stage SCI would occupy only the control region for the first stage SCI 10c1, the remaining control (10c2) and data region 12d can be used by other Us or remain vacant. The first stage SCI 10c1 would point to the second stage SCI 10c2 of time frame t2 (cf. pointer 14p1). This is corresponding to the retransmissions in future slots t2 to t6. Each of the future slots which are used for the sidelink transmission, here the slots t2, t4, and t6 would, according to embodiments, contain only the second stage SCI 10c2 and the corresponding data 12d. Note that the second stage SCI points to the respective data portion 12d of the respective time frame t2, t4, t6.

Figure 6A:
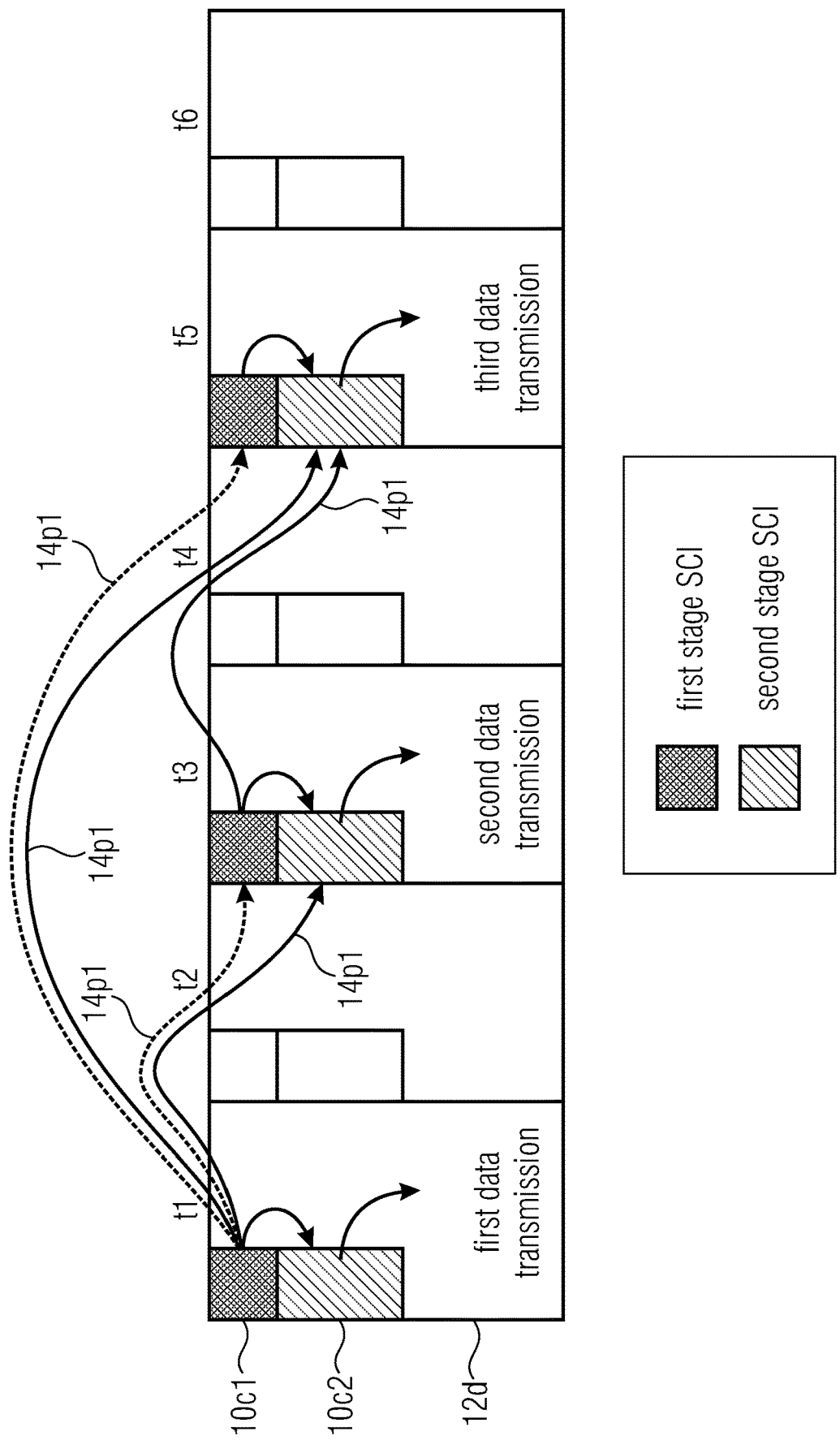
FIG. 6A illustrates schematically a sidelink frame structure comparable to a sidelink frame structure as illustrated by FIG. 5A, wherein the first control region is repeated according to embodiments.

FIG. 6A shows another variant, which is generally based on the variant discussed in context of FIG. 5A, wherein the first stage SCI 10c1 is sent multiple times on time slots t1, t3 where the second stage SCIs 10c2 and the data retransmission 12d occurs. This means that each frame t1, t3 and t5 includes all three regions, control region 1 10c1 (control region 2 10c2) and the data region 12d. This approach is beneficial when the RX UE has missed the first (cf. time frame t1) of the first stage SCIs 10c1. If it misses the first instance of the first stage SCI, instead of completely losing the transmission, the RX UE can decode the first stage SCI 10c1 in a later transmission instance (e.g., time frame t3). This would add redundancy to the first stage SCIs 10c1 and would enable the RX UE to receive the packet.

Note, according to embodiments, the first stage SCI 10c1 (e.g. of t1) can point to the respective (succeeding second stage SCIs 10c2, e.g., of t1, t3 and t5) or according to further embodiments also to the first stage SCIs of the succeeding frames, e.g., to 10c1 of t3 or t5. According to an advantageous variant, the first instance of the first stage SCI should indicate that there are repetitions in the coming time slots. This would allow to drop transmissions for other important transmissions, e.g., having another high priority reception or transmission. Alternatively, each second stage SCIs 10c1 can point to the succeeding time frames, e.g., to 10c1 of t3, 10c2 of t3 or 12d of t3.

Figure 6B:
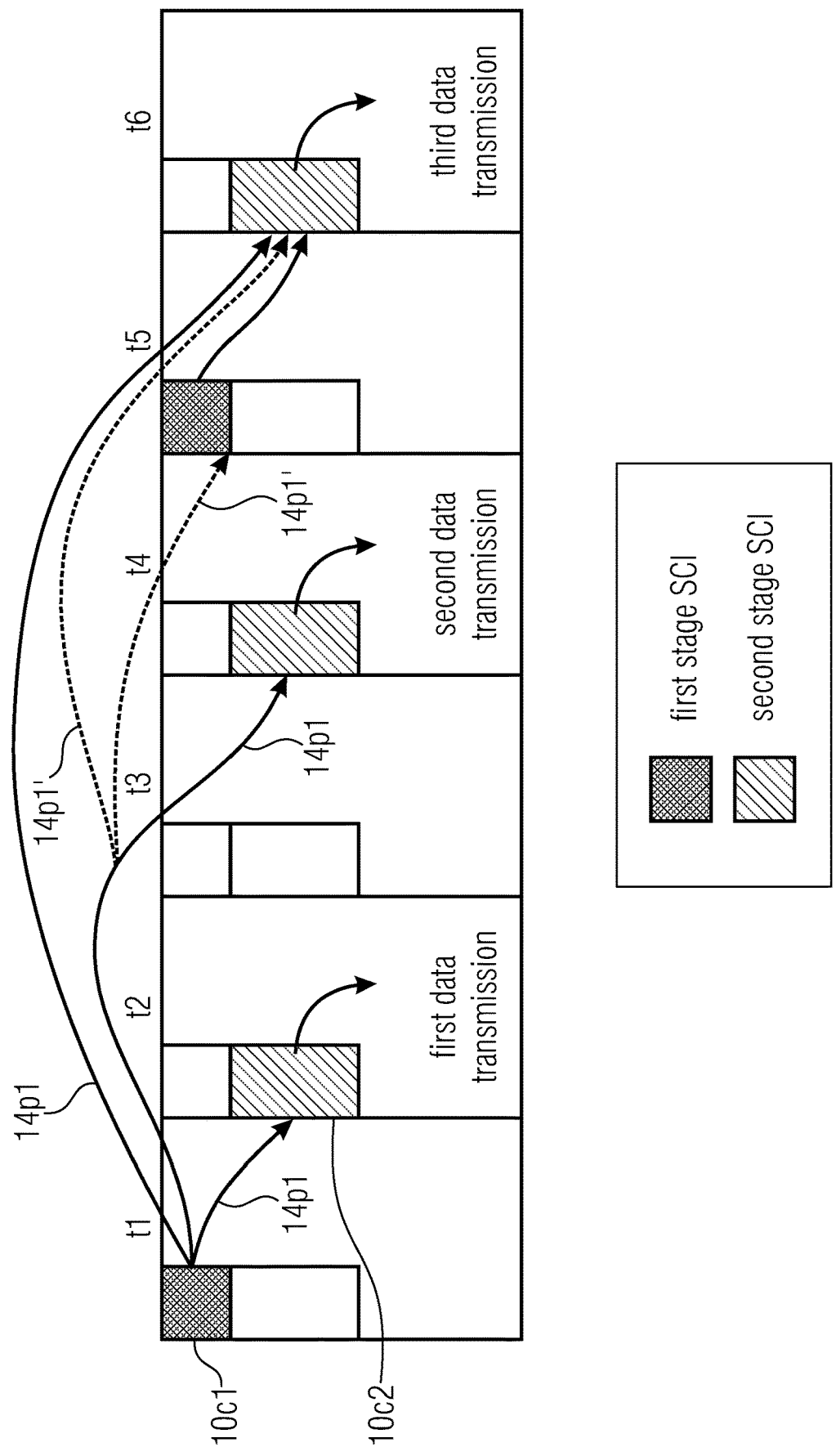
FIG. 6B shows schematically a sidelink frame structure comparable to the sidelink frame structure of FIG. 5B, wherein a first control region is repeated according to further embodiments.

FIG. 6B shows another embodiment substantially complies to the approach which has been discussed in context of FIG. 5B. Here, the first stage SCI 10c1 is sent in advance for the first time (cf. time frame t1), and repeated across the duration of the retransmission (cf. time frame t5). Note, that not each time frame is indicated by a control region 10c1 sent in advance to the respective time frame, as it is shown with respect to the time frame t3. Expressed from another point of view this means that 10c1 of t1 indicates 10c2 of t2 and 10c2 of t4, cf. pointer 14p1, (and, for example, 10c2 of t6 as well as 10c1 of t5, as illustrated by the pointer 14p1'), wherein 10c1 of t5 indicates 10c2 of t6.

Figure 7A:
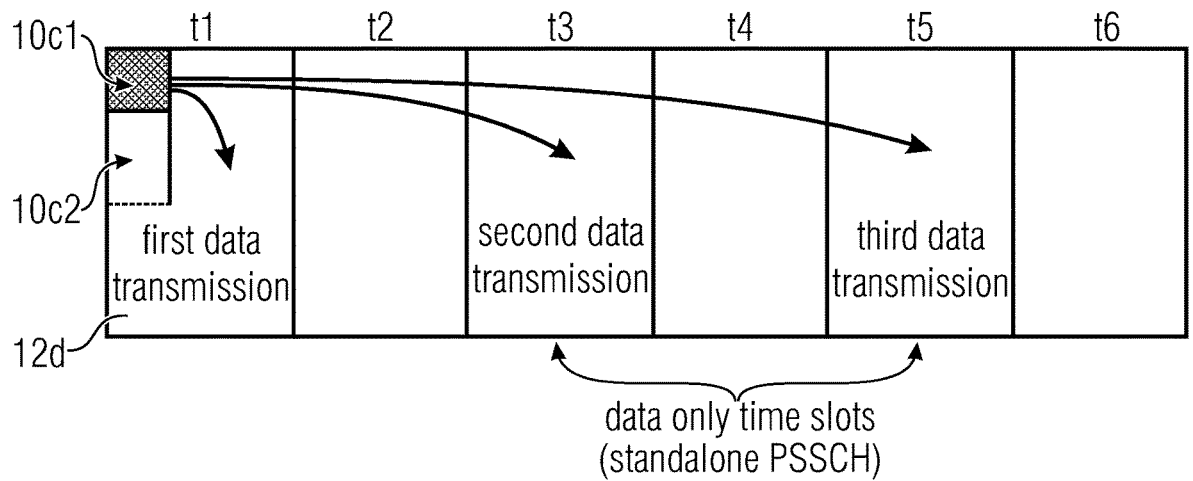
FIGS. 7A-7C illustrate schematically a timeframe structure according to an embodiment which uses another channel, e.g. PC5-RRC or Uu-RRC.

FIG. 7A shows another variant how the control information can be transmitted. In this case, the control information is transmitted partially via the time slots t1 as discussed above and partially via a higher layer signaling using RRC configurations, e.g., a level 2 PC5-RRC configuration. The PC5 RRC configurations are, for example, to be sent only for unicast communications, and are piggybacked on the PSSCH. Within each time slot at least a data region 12d is defined, with only some time slots having a control region 10c reserved/used. The control region 10c may contain only the first control region 10c1, or may contain both 10c1 as well as 10c2. Optionally, the control region 10c2, e.g., having a reduced size (including reduced to zero) can be used. This second control region 10c2 is illustrated by broken lines.

According to embodiments, the control information is transmitted at least by use of the first region 10c1 and the PC5 RRC configuration. Depending on the implementation, or the current requirements, the control portion 10c2 or part of the control portion 10c2 can be used as well. For example, the control portion 10c1 carrying the first stage SCI information 10c1, while the second stage SCI information is distributed to either the PC5 RRC configuration entirely, or partially to the region 10c2.

When comparing this embodiment of FIG. 7A using RRC configurations, e.g., the PC5-RRC for transmitting control information it should be noted that one of the primary assumptions is that the frame structure has to consist of a control region 10c and a data region 12d. In the case that there exists a data-only time slot, or a stand-alone PSSCH, the approach as shown by FIG. 7A can be used. Here a differentiation between different variants can be made.

According to embodiments, the initial control information is sent on the first stage 10c1 of the SCI, either in an advanced manner (cf. embodiments of FIG. 5B or 6b) or in the same time slot as the data to be transmitted (cf. embodiments of FIGS. 5a and 6a). The first stage SCI 10c1 is sent on a time slot t1 with a control region defined. The remaining control information is UE-specific and can be sent via the PC5-RRC to each individual RX UE, and handling the data to be sent in the stand-alone PSSCH time slot.

Figure 7B:
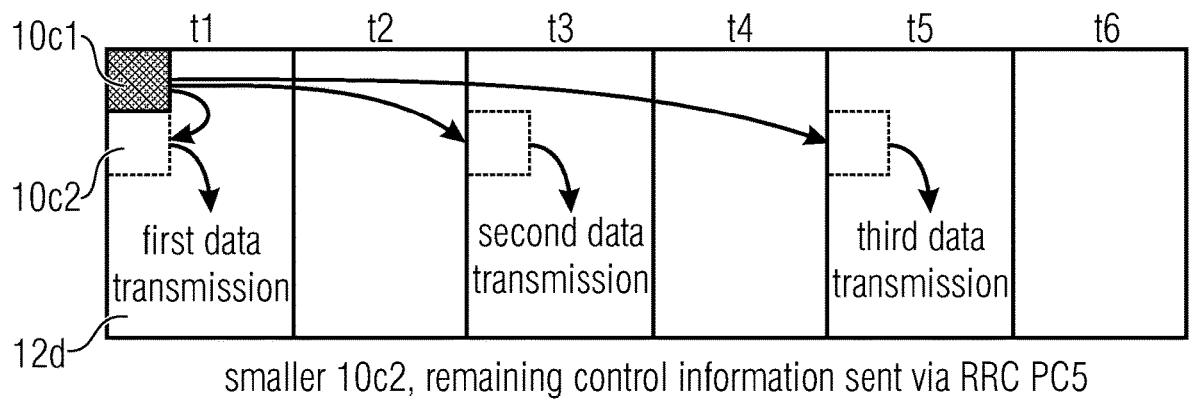
Figure 7C:
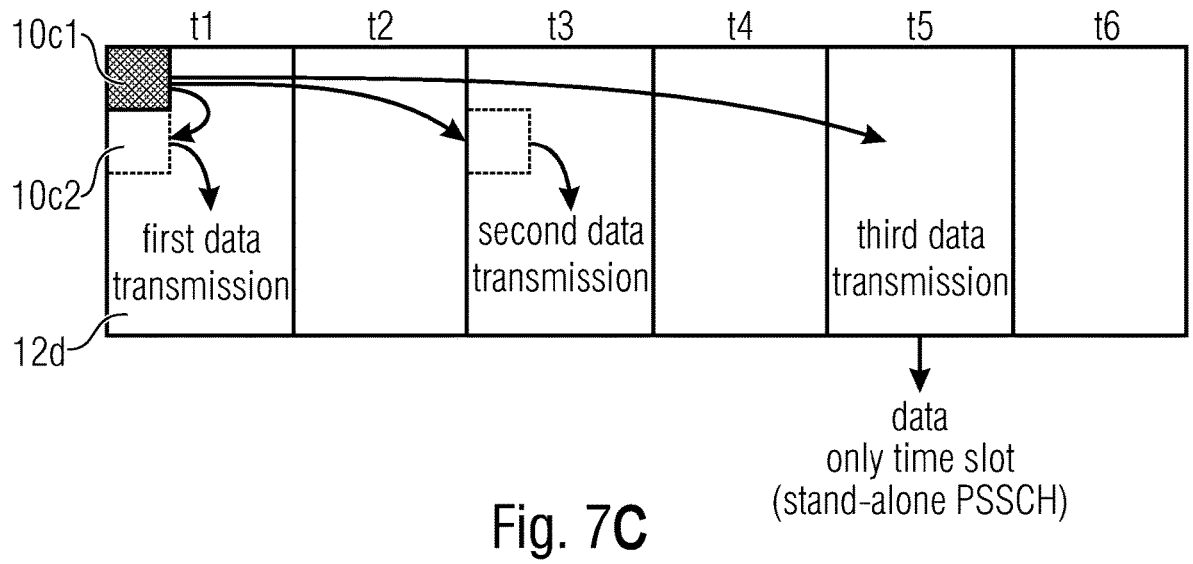

According to another embodiment of FIG. 7B, the initial control information is sent on the first stage 10c1 of the SCI, either in advance manner (cf. embodiment of FIGS. 5b and 6b) or in the same time slot as the data to be transmitted (cf. embodiment of FIGS. 5a and 6a). The remaining control information can be sent on the second stage SCI 10c2, however, the global parameters to be used can also be sent on the PC5-RRC, in order to reduce the size of the second stage SCI 10c2. In this case, the time slot has defined a control region.

According to an embodiment starting from this second case, it is also possible for the size of the second stage SCI 10c2 to reduce gradually over retransmissions, e.g. 10c2 of t3 having a reduced size when compared to 10c2 of t1. The remaining information can then be sent via the PC5-RRC. By the end of the retransmissions, the data can be sent without the second stage SC1, as it is illustrated by the time frame t5 of FIG. 7C (on a stand-alone PSSCH).

According to embodiments, it is possible for the base station to use the above-discussed principle. In this case, the RRC configuration is a so-called Uu-RRC, wherein the time frame structure does not belong to the sidelink time frame structure as used with respect to the above embodiments, but used for the uplink or the downlink between the base station and the UE. In this case, the base station also directly sends the RX UE detailed information about the data transmission via the Uu-RRC. However, it is beneficial to transmit a first stage SCI 10c1 because other UEs can be made aware of the upcoming/ongoing transmission, which is important when both, mode 1 and mode 2 UEs share the same resource pool.

Therefore, another embodiment provides a communication system comprising one or more base stations and a plurality of UEs, wherein a communication comprises one or more frames, each having a control region and a data region. Here, a control information belonging to a first control region is transmitted within the control region as first control region of the control region, wherein the control information belonging to a second control region is transmitted or partially transmitted using Uu-RRC.

Below further examples staying in connection to above embodiments, will be discussed.

In some of the embodiments described above, reference has been made to respective vehicles being either in the connected mode, also referred to as mode 1 or mode 3 configuration, or vehicles being in the idle mode, also referred to as mode 2 or mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Note, the above embodiments are applicable to vehicular communication systems, e.g. V2X, as in the context of cellular (e.g. 3G, 4G, 5G, or future) or ad-hoc communication networks.

According to an aspect, in the wireless communication system according to the invention, the sidelink transmission uses one or more subsequent sidelink frames, wherein the first control region of the one or more subsequent sidelink frames is vacant or to be used by other UEs or the plurality of UEs.

According to an aspect, in the wireless communication system according to the invention, the sidelink transmission uses one or more subsequent sidelink frames, wherein the information of the first control region transmitted using the first sidelink frame is repeated within the first control region of the one or more subsequent sidelink frames, wherein the repeated first control region comprises an information pointing to the second control regions in the further one or more subsequent sidelink frames.

According to an aspect, in the wireless communication system according to the invention, the first and the second control region are transmitted using different sidelink frames; and/or wherein the second control region is transmitted using a subsequent sidelink frame.

According to an aspect, in the wireless communication system according to the invention, the second control region belonging to the sidelink frame within which the first control region is transmitted is vacant or to be used by other UEs or the plurality of UEs.

According to an aspect, in the wireless communication system according to the invention, the size for transmitting the second control region is reduced gradually; or an amount of control information belonging to the second control region and transmitted using the second control region is reduced while an amount of control information belonging to the second control region and transmitted using the layer 2 PC5-RRC configurations is increased or an amount of control information belonging to the second control region and transmitted using the second control region is increased while an amount of control information belonging to the second control region and transmitted using the layer 2 PC5-RRC configurations is reduced.

According to an aspect, in the wireless communication system according to the invention, the control information is control information to be transmitted by one or more base stations.

According to an aspect, in the wireless communication system according to the invention, information belonging to the second control region is transmitted using an RRC configuration over the UU-link instead of the RRC configuration over the PC5 link.

According to an aspect, the wireless communication system according to the invention further comprises one or more base stations.

Another aspect provides a non-transitory digital storage medium having a computer program stored thereon to perform the method for a sidelink communication in a wireless communication system comprising a plurality of user devices, UEs, wherein the plurality of UEs are configured for a sidelink communication, wherein a sidelink communication comprises one or more sidelink frames each comprising a control region and a data region, wherein the control region comprises a first control region and a second control region, wherein the first control region comprising basic information regarding a sidelink transmission of a packet, the second control region comprising information regarding data transmission resource location or data transmission resource locations of the packet, wherein a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames, when said computer program is run by a computer.

According to an aspect, the wireless communication system according to the invention, the UE comprises one or more of a mobile terminal, or stationary terminal, or cellular IoT-UE, or vehicular UE, or an IoT or narrowband IoT, NB IoT, device, or a ground base station vehicle, or n aerial vehicle, or a drone, or a moving base station, or a roadside unit, or a building, or any other items or devices provided with network connectivity enabling the item/device to communicate using the wireless communication network, e.g., a sensor or actuator, and wherein a base station comprises one or more of a macro cell base station, or a small cell base station, or a central unit of a base station, or a distributed unit of a base station, or a roadside unit, or a UE, or a remote radio head, or an AMF, or an SMF, or a core network unit, or a network slice as in the NR or 5G core context, or any transmission/reception point, TRP, enabling an item or a device to communicate using the wireless communication network, the item or device being provided with network connectivity communicating using the wireless communication network.

According to an aspect, the wireless communication system according to the invention, the sidelink frame comprises a transmission time interval, a certain interval for which the apparatus reserved resources, like a sidelink sub frame, a TTI, a slot, and/or a mini-slot.

Another aspect may have a user device, UE, for a wireless communication system comprising a plurality of user devices, UEs, wherein the plurality of UEs are configured for a sidelink communication, wherein a sidelink communication comprises one or more sidelink frames each comprising a control region and a data region, wherein a control information belonging to a first control region is transmitted within the control region as first control region of the control region, wherein a control information belonging to a second control region is transmitted or partially transmitted using layer 2 PC5-RRC configurations.

Another aspect may have a base station for a wireless communication system, comprising one or more base stations, and a plurality of user devices, UEs, wherein the plurality of UEs are configured for a sidelink communication, wherein a sidelink communication comprises one or more sidelink frames each comprising a control region and a data region, wherein the control region comprises a first control region and a second control region, wherein the first control region comprising basic information regarding a sidelink transmission of a packet, the second control region comprising information regarding data transmission resource location or data transmission resource locations of the packet, wherein a transmission of the packet uses more than a single data transmission resource location in a single sidelink frame, and/or wherein the packet is to be transmitted in data transmission resource locations across one or more subsequent sidelink frames, or wherein multiple versions of the packet are to be transmitted in data transmission resource locations across one or more subsequent sidelink frames.

Another aspect may have a base station for a wireless communication system, comprising one or more base stations, and a plurality of user devices, UEs, wherein the plurality of UEs are configured for a sidelink communication, wherein a sidelink communication comprises one or more sidelink frames each comprising a control region and a data region, wherein a control information belonging to a first control region is transmitted within the control region as first control region of the control region, wherein a control information belonging to a second control region is transmitted or partially transmitted using layer 2 PC5-RRC configurations.

Another aspect may have a method for a sidelink communication in a wireless communication system comprising a plurality of user devices, UEs, wherein the plurality of UEs are configured for a sidelink communication, wherein a sidelink communication comprises one or more sidelink frames each comprising a control region and a data region, wherein a control information belonging to a first control region is transmitted within the control region as first control region of the control region, wherein a control information belonging to a second control region is transmitted or partially transmitted using layer 2 PC5-RRC configurations.

Another aspect may have a non-transitory digital storage medium having a computer program stored thereon to perform the method for a sidelink communication in a wireless communication system comprising a plurality of user devices, UEs, wherein the plurality of UEs are configured for a sidelink communication, wherein a sidelink communication comprises one or more sidelink frames each comprising a control region and a data region, wherein a control information belonging to a first control region is transmitted within the control region as first control region of the control region, wherein a control information belonging to a second control region is transmitted or partially transmitted using layer 2 PC5-RRC configurations, when said computer program is run by a computer.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 8:
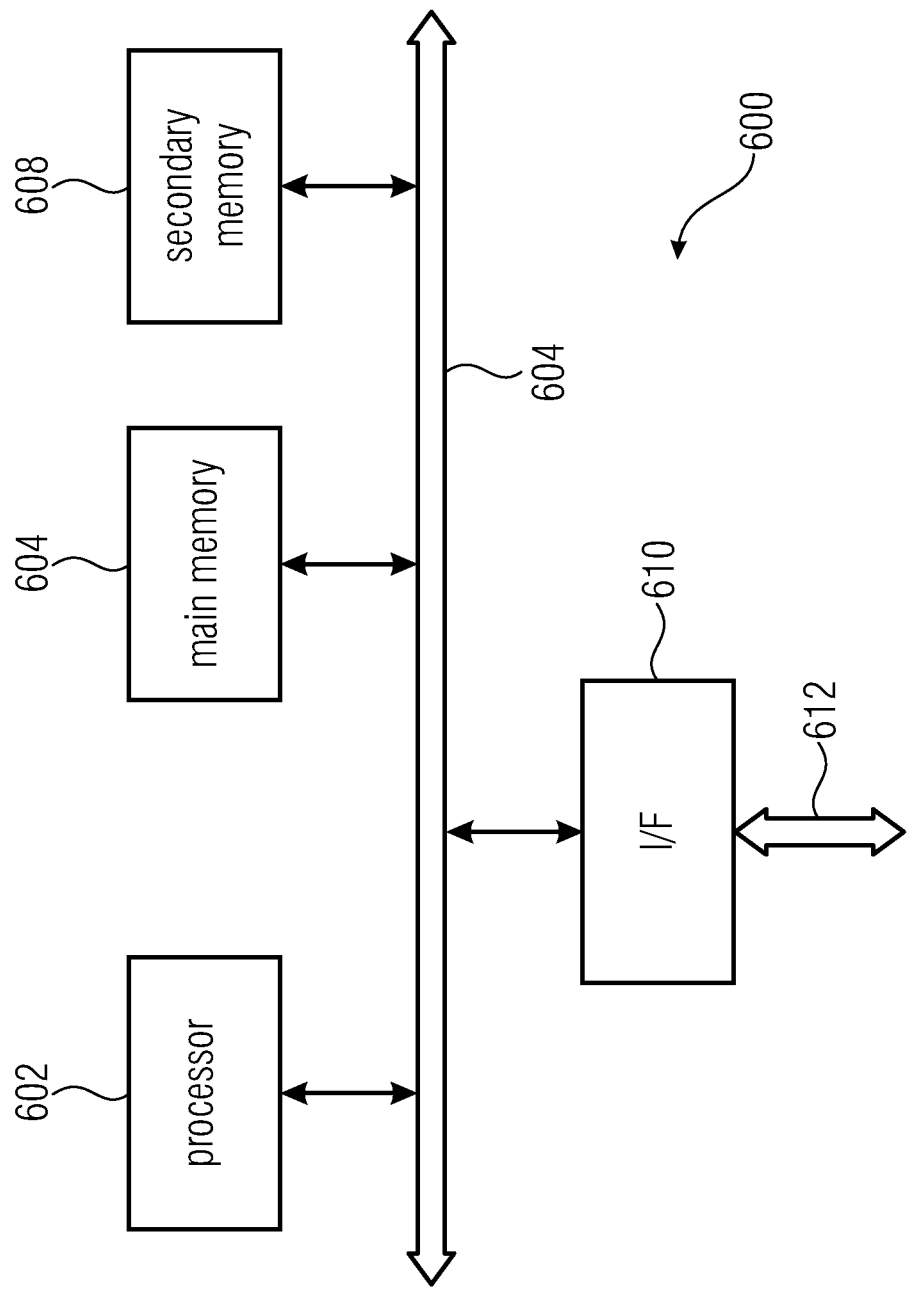
FIG. 8 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

| LIST OF ACRONYMS AND SYMBOLS | |
|---|---|
| V2X | Vehicle-to-Everything |
| 3GPP | Third Generation Partnership Project |
| D2D | Device-to-Device |
| ITS | Intelligent Transport Services |

-continued

LIST OF ACRONYMS AND SYMBOLS

| | |
|---|---|
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |
| M1 | Mode 1 |
| M2 | Mode 2 |
| M3 | Mode 3 (LTE V2X) |
| M4 | Mode 4 (LTE V2X) |

The invention claimed is:

1. An apparatus comprising:
wherein the processor circuit is arranged for a sidelink communication,
wherein the sidelink communication comprises at least one sidelink frames,
wherein each of the at least one sidelink frames have a control region and a data region,
wherein the control region comprises a first control region and a second control region,
wherein the first control region comprises basic information regarding a sidelink transmission of a packet,
wherein the second control region comprises information regarding data transmission resource location or data transmission resource locations of the packet,
wherein the processor circuit is arranged to transmit the packet using more than a single data transmission resource location in a single sidelink frame such that the packet or multiple redundant, versions of the packet is/are to be transmitted in data transmission resource locations across the at least one sidelink frames and at least one subsequent sidelink frames.

2. The apparatus according to claim 1,
wherein the at least one subsequent sidelink frames are located in continuous or non-continuous sidelink frames, or
wherein between two subsequent sidelink frames a second sidelink frame is used by a user equipment.

3. The apparatus according to claim 1,
wherein the first control region and the second control region are transmitted using the same sidelink frame, or
wherein the first control region and the second control region are transmitted using the same sidelink frame along with a portion of the data transmission, or a first version of the data transmission.

4. The apparatus according to claim 1,
wherein the first control region comprises an information,
wherein the information comprises a reservation of resources or an information on the second control region or an information pointing to the second control region,
wherein the second control region is in the same sidelink frame,
wherein the second control region is in each of the at least one subsequent sidelink frames.

5. The apparatus according to claim 1,
wherein the sidelink transmission uses at least one subsequent sidelink frames,
wherein the second control region of the at least one subsequent sidelink frames comprises an information regarding the data transmission resource location of the respective sidelink frame or regarding data transmission resource locations.

6. The apparatus according to claim 1,
wherein the first control region comprises an information,
wherein the information comprises a reservation of resources or an information on the second control region or an information pointing to the second control regions in a respective or in the at least one subsequent sidelink frames.

7. The apparatus according to claim 1,
wherein the sidelink transmission uses at least one subsequent sidelink frames,
wherein each of the at least one subsequent sidelink frames comprises a respective second control portion; and/or
wherein a respective second control portion of at least one succeeding sidelink frames comprises an information pointing to the data region within the respective sidelink frames.

8. The apparatus according to claim 5,
wherein within at least one of the succeeding sidelink frames a respective first control portion is retransmitted; and/or
wherein the respective first control portion comprises an information pointing to the at least one second control portions in the at least one further subsequent sidelink frames.

9. The apparatus according claim 1, wherein the first control portion comprises an information regarding the destination ID of an RX UE; and/or an information regarding a number of the data transmission resource locations; and/or a number of the sidelink frames used for data transmission resource locations; and/or an information pointing to the respective second control portions transmitted using subsequent sidelink frames.

10. An apparatus comprising:
a processor circuit and a memory circuit, wherein the memory is arranged to store instructions for the processor circuit,
wherein the processor circuit is arranged for a sidelink communication,
wherein the sidelink communication comprises at least one sidelink frames,
wherein the at least one sidelink frames comprises a first sidelink frame and at least one subsequent sidelink frames
wherein each of the at least one sidelink frames have a control region and a data region,
wherein a control information belonging to a first control region is transmitted within the data region,
wherein a control information belonging to a second control region is transmitted or partially transmitted using a layer 2 PC5-RRC configurations,
wherein the processor circuit is arranged to transmit the packet using more than a single data transmission resource location in a single sidelink frame such that the packet or multiple redundant, versions of the packet is/are to be transmitted in data transmission resource locations across the at least one sidelink frames and at least one subsequent sidelink frames.

11. The apparatus according to claim 10,
wherein the control region comprises a third control region,
wherein a portion of the control information belonging to the second control region is transmitted in the third control region the control region.

12. The apparatus according to claim 10, wherein the first control region is transmitted using any of the sidelink frames previous to the sidelink frame used for a sidelink transmission of a packet data region or together with the sidelink transmission of the packet.

13. The apparatus according to claim 10, wherein the second control region is transmitted using the at least one subsequent sidelink frames.

14. The apparatus according to claim 10, wherein the second control region is transmitted using a sidelink frame previous to the sidelink frame used for a sidelink transmission of a packet or together with the sidelink transmission of the packet.

15. The apparatus according to claim 10,
wherein the first control region comprises an information pointing to the second control region or to the information belonging to a second control region transmitted or partially transmitted using the layer 2 PC5-RRC configurations; and/or
wherein the information pointing to a second control region transmitted or partially transmitted as second control region of the control region comprises an information pointing to the second control region of a subsequent sidelink frame or to the information belonging to the second control region transmitted or partially transmitted using the layer 2 PC5-RRC configurations; and/or
wherein the second control region comprises an information regarding data transmission resource location or data transmission resource locations of the packet.

16. The apparatus according to claim 14,
wherein a transmission of the packet uses at least two single data transmission resource locations in a single sidelink frame, and/or
wherein the packet is to be transmitted in data transmission resource locations across at least one subsequent sidelink frames, or
wherein multiple versions of the packet are to be transmitted in data transmission resource locations across at least one subsequent sidelink frames.

17. A method comprising:
transmitting a sidelink communication,
wherein the sidelink communication comprises at least one sidelink frames,
wherein each of the at least one sidelink frames have a control region and a data region,
wherein the control region comprises a first control region and a second control region,
wherein the first control region comprises basic information regarding a sidelink transmission of a packet,
wherein the second control region comprises information regarding data transmission resource location or data transmission resource locations of the packet; and
transmitting the packet using more than a single data transmission resource location in a single sidelink frame such that the packet or multiple redundant, versions of the packet is/are to transmitted in data transmission resource locations across the at least one sidelink frames and at least one subsequent sidelink frames.

18. The method according to claim 17,
wherein the at least one subsequent sidelink frames are located in continuous or non-continuous sidelink frames, or
wherein between two subsequent sidelink frames a second sidelink frame is used by a user equipment.

19. The method according to claim 17,
wherein the first control region and the second control region are transmitted using the same sidelink frame, or
wherein the first control region and the second control region are transmitted using the same sidelink frame along with a portion of the data transmission, or a first version of the data transmission.

20. The method according to claim 17,
wherein the first control region comprises an information,
wherein the information comprises a reservation of resources or an information on the second control region or an information pointing to the second control region,
wherein the second control region is in the same sidelink frame,
wherein the second control region is in each of the at least one subsequent sidelink frames.

21. The method according to claim 17,
wherein the sidelink transmission uses at least one subsequent sidelink frames,
wherein the second control region of the at least one subsequent sidelink frames comprises an information regarding the data transmission resource location of the respective sidelink frame or regarding data transmission resource locations.

22. The method according to claim 17,
wherein the first control region comprises an information,
wherein the information comprises a reservation of resources or an information on the second control region or an information pointing to the second control regions in a respective or in the at least one subsequent sidelink frames.

23. The method according to claim 17,
wherein the sidelink transmission uses at least one subsequent sidelink frames,
wherein each of the at least one subsequent sidelink frames comprises a respective second control portion; and/or
wherein a respective second control portion of at least one succeeding sidelink frames comprises an information pointing to the data region within the respective sidelink frames.

24. The method according to claim 21,
wherein within at least one of the succeeding sidelink frames a respective first control portion is retransmitted; and/or
wherein the respective first control portion comprises an information pointing to the at least one second control portions in the at least one further subsequent sidelink frames.

25. The method according to claim 17,
wherein the first control portion comprises an information regarding the destination ID of an RX UE; and/or an information regarding a number of the data transmission resource locations; and/or a number of the sidelink frames used for data transmission resource locations;

and/or an information pointing to the respective second control portions transmitted using subsequent sidelink frames.

26. The method according to claim 17,
wherein the at least one sidelink frames comprise a transmission time interval, a first interval, a TTI, a slot, and/or a mini-slot,
wherein the first interval has reserved resources.

27. The apparatus according to claim 1,
wherein the at least one sidelink frames comprise a transmission time interval, a first interval, a TTI, a slot, and/or a mini-slot,
wherein the first interval has reserved resources.

* * * * *